(12) United States Patent
Landwehr

(10) Patent No.: US 8,128,292 B2
(45) Date of Patent: Mar. 6, 2012

(54) ROTATIONAL BEARING OF A ROTATIONAL BODY

(76) Inventor: Wilhelm Landwehr, Wilhelmshaven (DE)

( * ) Notice: Subject to any disclaimer, the term of this patent is extended or adjusted under 35 U.S.C. 154(b) by 942 days.

(21) Appl. No.: 10/574,396

(22) PCT Filed: Oct. 2, 2003

(86) PCT No.: PCT/EP03/10979
§ 371 (c)(1),
(2), (4) Date: May 13, 2008

(87) PCT Pub. No.: WO2005/033532
PCT Pub. Date: Apr. 14, 2005

(65) Prior Publication Data
US 2008/0205812 A1 Aug. 28, 2008

(51) Int. Cl.
*F16C 19/00* (2006.01)
(52) U.S. Cl. ........................................... 384/549
(58) Field of Classification Search .................. 384/549, 384/445, 548, 627
See application file for complete search history.

(56) References Cited

U.S. PATENT DOCUMENTS

| | | | | |
|---|---|---|---|---|
| 1,755,238 A | * | 4/1930 | Bryant | 384/549 |
| 1,981,096 A | | 11/1934 | Dubus | |
| 2,010,752 A | | 8/1935 | Dubus | |
| 2,718,168 A | * | 9/1955 | Kendall et al. | 384/549 |
| 2,871,987 A | * | 2/1959 | Du Bois | 384/549 |
| 4,535,661 A | * | 8/1985 | Berbalk | 384/462 |
| 4,926,493 A | * | 5/1990 | Junker | 384/490 |
| 6,099,168 A | * | 8/2000 | Sishtla | 384/549 |

FOREIGN PATENT DOCUMENTS

| | | |
|---|---|---|
| BE | 553412 | 6/1957 |
| DE | 3306745 | 8/1984 |
| DE | 20208073 | 10/2003 |
| GB | 810791 | 3/1959 |

OTHER PUBLICATIONS

International Search Report dated Jun. 25, 2004, application No. PCT/EP 03/10979.

* cited by examiner

*Primary Examiner* — Thomas R Hannon
(74) *Attorney, Agent, or Firm* — RatnerPrestia

(57) ABSTRACT

A rotational bearing configured to support a first body for rotation relative to a second body about a rotational axis, one of the first or second bodies being a rotational body and the other being a support body, the rotational bearing comprising a plurality of carrier rollers. Each carrier roller is individually mounted to the first body for rotation about a respective carrier roller rotational axis extending therefrom. Each carrier roller is in rolling contact with the second body.

30 Claims, 5 Drawing Sheets

ROTATIONAL BEARING OF A ROTATIONAL BODY

This application is the U.S. national phase application of PCT International Application No. PCT/EP2003/010979, filed Oct. 2, 2003.

BACKGROUND OF THE INVENTION

1. Technical Field

The invention relates to the rotational bearing of a rotational body, i.e. an arrangement comprising a support body, the rotational body and a plurality of carrier rollers, via which the rotational body is rotatably supported on the support body by rolling contact.

2. Description of the Related Art

Rotationally mounting axes and shafts or revolving components on axes with the aid of roll bearings allows axial and/or radial forces and moments to be transferred from the axis/shaft onto the surrounding structure, depending on the embodiment of the bearings.

A roll bearing generally consists of an inner and an outer running surface, between which a number of roll bodies are mounted. The roll bodies roll off on the running surfaces, such that a rotational movement between the running surfaces results from the relative movements at the contact points of the roll bodies and running surfaces. The running surfaces are generally provided by an outer and an inner bearing ring.

From the specification of rotatably connecting the axis/shaft to the surrounding structure and/or rotatably connecting the surrounding component to the axis, it follows that the inner bearing ring must surround the axis/shaft, i.e. it is provided with an opening which receives a corresponding section of the axis/shaft. The outer ring is correspondingly larger.

When mounting large axes/shafts or large components on correspondingly large axis, both the dimensions of the axis/shaft and the forces and moments to be transferred require the roll bearings to reach an enormous size in parts, and these are correspondingly expensive.

Bearing slackness increases due to abrasion on the roll bodies and running paths, and the running accuracy of the bearing decreases. Once an abrasion limit—dependent on the respective application—is reached, the bearing must be renewed or overhauled. This often requires the axis/shaft to be dismantled and may therefore necessitate long and expensive downtimes for the machine or plant.

SUMMARY OF THE INVENTION

It is an object of the invention to facilitate renewing and/or overhauling a rotational bearing of a rotational body. The intention is to enable the rotational bearing to be renewed or repaired without the rotationally mounted rotational body having to be disassembled or dismantled as a whole from its rotational bearing.

In accordance with another aspect of the invention, an object is to extend the regular period of use of a rotational bearing before it is renewed and/or overhauled.

The former object in particular is solved by one or more of the embodiments described below. For solving the latter object, the invention proposes an adjustability of the rotational bearing, using which a bearing clearance can be equalized.

Where the claims mention a body, in particular a rotational body and a support body, this term is understood to mean both a body formed in one piece and a structure composed of separate parts which perform movements as a whole. The rotational body understood in this way is rotatably supported, i.e. rotatably mounted, on the support body understood in this way. In accordance with the invention, multiple carrier rollers are mounted such that they can individually rotate, each about a carrier axis of its own, and not in a common bearing retainer, as in standard roll bearings. Mounting can in particular be on a shaft section of the rotational body or on an axis section of the support body. Multiple rotational bearings of the type in accordance with the invention can also be arranged between the rotational body and the support body, each arranged on a different shaft section or axis section. Multiple rotational bearings can also be arranged adjacently on the same shaft section or axis section, in order for example to achieve or increase the rigidity of the bearing and/or clamp against bending. Where the shaft section or axis section have been mentioned above, the functional terms "shaft" and "axis" refer to the rotational movement of the rotational body relative to the support body, i.e. the mounting shaft section of the rotational body transfers the torque for the rotational movement, while the mounting axis section of the support body does not transfer a torque if the rotational bearing is frictionless.

The arrangement of carrier rollers, arranged such that they can each rotate about their respective carrier roller rotational axis, mounts and centres the rotational body. The carrier roller rotational axes are secured carrier axes of the support body—which can be a stationary frame or indeed also another rotational body or otherwise movable body—or of the rotational body. Carrier roller rotational axes which are adjustable, as is in fact preferred in order to equalize inevitable bearing clearances by adjusting the position of a carrier roller rotational axis or the positions of multiple or all carrier roller rotational axes, are also secured in the sense of the invention. The carrier roller rotational axes can be formed by carrier trunnions connected to the support body or the rotational body such that they can be rotated about the rotational axes respectively or preferably such that they are rotationally rigid. Three carrier rollers are in principle sufficient for mounting and centring about the rotational axis of the rotational body; preferably, however, the rotational body is supported and rotatably mounted by more than three carrier rollers.

In a preferred embodiment, the carrier rollers roll off on a running surface which is rotationally symmetrical with respect to the rotational axis of the rotational body. Said running surface is formed as a cylindrical shell inner surface or a cylindrical shell outer surface, depending on the connection between the carrier rollers and the rotational body or support body.

The rotational bearing is preferably designed such that each individual carrier roller can be optionally disassembled from the body supporting it, i.e. from the rotational body or support body, but the rotational body is still mounted such that it is centred relative to the support body after disassembly. Disassembling a carrier roller, for example if it has a defect or after excess abrasion, does not in itself cause any change in the spatial position of the rotational axis of the rotational body relative to the support body.

In order to achieve this characteristic, which is advantageous for maintaining and repairing the rotational bearing, replacement carrier rollers can be provided, in sufficient numbers and in a suitable arrangement about the rotational axis of the rotational body, which can be pitched onto the running surface on which the carrier rollers roll off, before the carrier roller in question is disassembled. In principle, it is then for example possible to support the rotational body and mount it centred in each radial direction with respect to the rotational axis by means of three carrier rollers in rolling contact, wherein each of the three carrier rollers is assigned a replacement carrier roller in its immediate vicinity. If the rotational bearing comprises five or even more carrier rollers in rolling contact, as is preferred, then it would already no longer be necessary for each of said carrier rollers to be individually assigned a replacement carrier roller by arranging one in its immediate vicinity; rather, just two diametrically opposing replacement carrier rollers alone would be sufficient, in order to be able to optionally disassemble each of the carrier rollers in rolling contact.

The ability to optionally remove each of the carrier rollers in rolling contact, or preferably multiple carrier rollers simultaneously, is advantageously achieved by providing the carrier rollers in rolling contact in a sufficiently large number for this purpose and by providing them about the rotational axis of the rotational body in suitably selected rotational angular positions, such that each of said carrier rollers can at least be disassembled on its own, but the rotational body is supported and rotatably mounted by the remaining carrier rollers, even after disassembly. Three carrier rollers in rolling contact would in principle be sufficient to achieve this characteristic, if the just two carrier rollers in rolling contact then remaining continue to bear the rotational body centred. This could be achieved by enabling the carrier rollers to be adjusted about the rotational axis without breaking rolling contact. Preferably, however, more than three carrier rollers in rolling contact are provided, even more preferably at least five, such that each of the carrier rollers in rolling contact can easily be disassembled on its own. Thus, for example, in the case of seven carrier rollers in rolling contact, arranged in uniform distribution about the rotational axis, any two of the carrier rollers can be optionally disassembled. The rotational bearing therefore preferably comprises at least five carrier rollers in rolling contact, and more preferably even more such carrier rollers.

In preferred embodiments, the carrier rollers are axially divided at least once, preferably exactly once, into carrier roller segments. This can on the one hand facilitate assembly and disassembly. If the carrier roller segments are connected to each other in a non-positive lock, preferably elastically tensed axially towards or away from each other, for example by means of one or more tension or pressure springs which directly or indirectly act on the segments, then inaccuracies in the rolling-off surfaces can advantageously be equalized. The elasticity forces acting between the carrier roller segments of each carrier roller advantageously tense the segments onto the running surface on which the carrier roller in question rolls off. The carrier roller in question and the running surface on which it rolls off comprise mutually contacting surfaces which are shaped such that the elasticity force between the carrier roller segments can act over the running surface. This is the case with a concave or convex profile, which is also preferred for other reasons. In addition to the connection in a non-positive lock, the carrier roller segments are preferably also connected to each other in a positive lock, such that for each divided carrier roller, the segments can only be moved relative to each other along the carrier roller axis. For this purpose, the segments for each divided carrier roller are each guided on each other by means of at least one linear guiding element, preferably each by means of at least two linear guiding elements. The linear guiding element can be formed by the respective carrier roller itself and/or by a separate element, in particular a connecting element.

Where the claims mention an axial division of a body into for example two axial segments, the axial segments are intended to be arranged adjacently along the rotational axis of the rotational body or along an axis parallel to it, i.e. with axially pointing facing surfaces facing each other, preferably abutting each other. Where the claims mention a radial division of a body, the multiple body parts each form a sector in cross-section, for example a sector of a circle in the manner of pieces of cake or a sector of a circular ring.

BRIEF DESCRIPTION OF THE DRAWINGS

Preferred example embodiments of the invention are explained below on the basis of figures. Features disclosed by the example embodiments, each individually and in any combination of features, develop various aspects of the invention. The features disclosed by one of the example embodiments can also be realized in combination with one or more features of another example embodiment, providing such combinations can be realized technically and do not lead to contradictions.

DETAILED DESCRIPTION OF THE PREFERRED EMBODIMENTS

Figure 1:
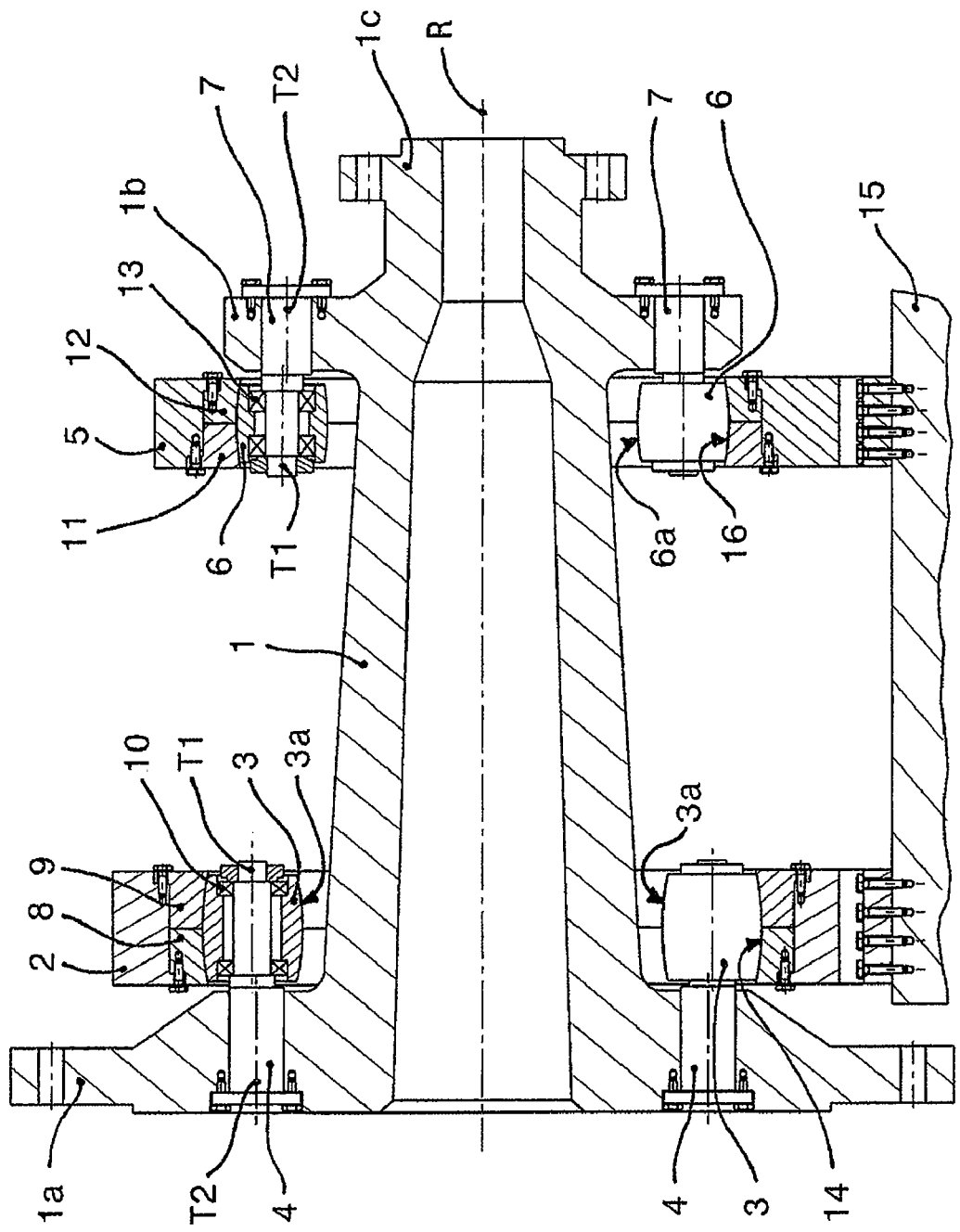
FIG. 1 is a cross-sectional view of a rotational bearing that is a first embodiment of the present invention rotationally supporting a first illustrative rotational body relative to a first illustrative support body.

FIG. 1 shows an example embodiment of a rotational bearing in which the carrier rollers revolve with a shaft 1 in a stationary frame 2.

At one end, the shaft 1 has a flange 1a which is connected to a joined component (not shown)—for example, the rotor hub of a wind power plant—via screw bolts (not shown).

A number of carrier trunnions 4 are fixed in sections of the flange 1a, and at their other end comprise sections on which carrier rollers 3 are rotatably mounted. The rotational axes T1 of the carrier rollers 3, formed by means of the carrier trunnions 4, are preferably arranged parallel to the longitudinal axis of the shaft 1.

The shaft 1 is surrounded by the stationary frame 2 which comprises a rotationally symmetrical running surface 14 facing the shaft 1.

The carrier rollers 3 abut the running surface 14, radially arranged about the shaft 1, and roll off on the running surface 14 when there is a relative rotation between the shaft 1 and the frame 2.

The axial and radial operating forces which act on the shaft 1 via the flange 1a are transferred from the carrier rollers 3 onto the frame 2 via the running surface 14. The frame 2 is fixedly connected to a carrier structure 15.

The carrier rollers 3 are preferably mounted on the carrier axes 4 by an arrangement of roll bearings 10 suitable for transferring the forces arising. This can for example be a bearing with biased tapered roller bearings in an O arrangement.

The running surface 14 of the frame 2 and the shell surface 3a of the carrier rollers 3 preferably exhibit an approximately congruent profile in their contact zone—in this example embodiment, a circular arc. The running surface 14 is formed as a section of a hollow sphere. The circular arc radius of the longitudinal profile of the shell surface 3a is somewhat smaller than the circular arc radius of the running surface 14, such that the carrier rollers 3 conform to the running surface 14 due to the effect of an operating load in their contact zone.

The carrier rollers 3 are orientated with respect to the shaft 1 in such a way that the circular centre-points of their arc profiles shaped in the contact zone by the operating load coincide in a common point on the rotational axis of the shaft 1. From this arrangement, and by configuring the contact zones of the running surface 14 and the carrier rollers 3, an angled bearing between the shaft 1 and the frame 2 about a common point on the rotational axis of the shaft 1 is enabled. Such a bearing prevents the carrier rollers 3 from jamming in the running surface 14 of the frame 2 when the shaft 1 warps due to the effect of an operating load.

The shaft 1 comprises another flange 1b which in turn bears a number of carrier rollers 6 via carrier trunnions 7. The carrier rollers 6, having shell surfaces 6a, roll off on the running surface 16 of a second stationary frame 5 fixedly connected to the carrier structure 15. The shape of the running surface 16 and of the carrier rollers 6 corresponds to the type already described, such that an angled adjustability of the shaft 1 relative to the frame 5 is also provided in this bearing point. The adjustability of the two bearing points also enables misalignments resulting from the positioning of the frames 2 and 5 to be equalized.

The carrier rollers 6 are preferably mounted on the carrier trunnions 7 by roll bearings 13 which allow the carrier rollers 6 to be axially shifted on the carrier trunnions 7. This can for example be achieved by mounting using cylindrical roller bearings comprising rimless inner rings. This ensures that the shaft 1 can be freely extended axially; the bearing by the carrier rollers 6 and the frame 5 only supports the shaft 1 against radial forces and thus acts as a torque support for the entire shaft bearing.

The carrier trunnions 4 and 7 are adjustable, in order to be able to adjust the carrier roller rotational axes T1. Each of the rotational axes T1 and thus each of the carrier rollers 3 and 6 are individually adjustable. The adjustment changes the radial distance between the rotational axis T1 and the rotational axis R. The distance is continuously, i.e. non-incrementally, adjustable. The rotational axes T1 can be fixed in any adjustment position. For adjustability, the carrier trunnions 4 and 7 each exhibit an eccentricity between the sections for installation in the flanges 1a and 1b and the sections for mounting the carrier rollers 3 and 6. This embodiment enables the radial distance between the rotational axes of the carrier rollers 3 and 6 and the rotational axis of the shaft 1 to be changed. The carrier trunnions 4 and 7 are each mounted such that they can rotate about a trunnion axis T2 of their own. For each of the carrier trunnions 4 and 7, the trunnion axis T2 is eccentric with respect to the carrier roller rotational axis T1. The distance between the carrier rollers 3 and 6 and the running surfaces 14 and 16, i.e. the bearing slackness, can be set for each of the carrier rollers 3 and 6, which can equalize the abrasion and production tolerances of the components within certain limits.

The running surfaces 14 and 16 of the frames 2 and 5 are formed by bearing rings 8, 9 and 11, 12 which are radially divided, preferably repeatedly, and arranged successively in the direction of the centre axes of the running surfaces 14 and 16, i.e. axially divided. They are fixedly connected to the frames 2 and 5. Using this embodiment, first the outer bearing rings 8 and 12, then the carrier rollers 3 and 6 and lastly the inner bearing rings 9 and 11 can be assembled, from the area between the frames 2 and 5. This design enables the roll partners to be exchanged or overhauled, without having to detach the shaft 1 from the interconnected components, resulting in significant time and cost advantages, depending on the application.

In its further progression, the shaft 1 comprises a third flange 1c which is connected to another component (not shown)—for example, an electric generator—via screw bolts (not shown).

Figure 2:
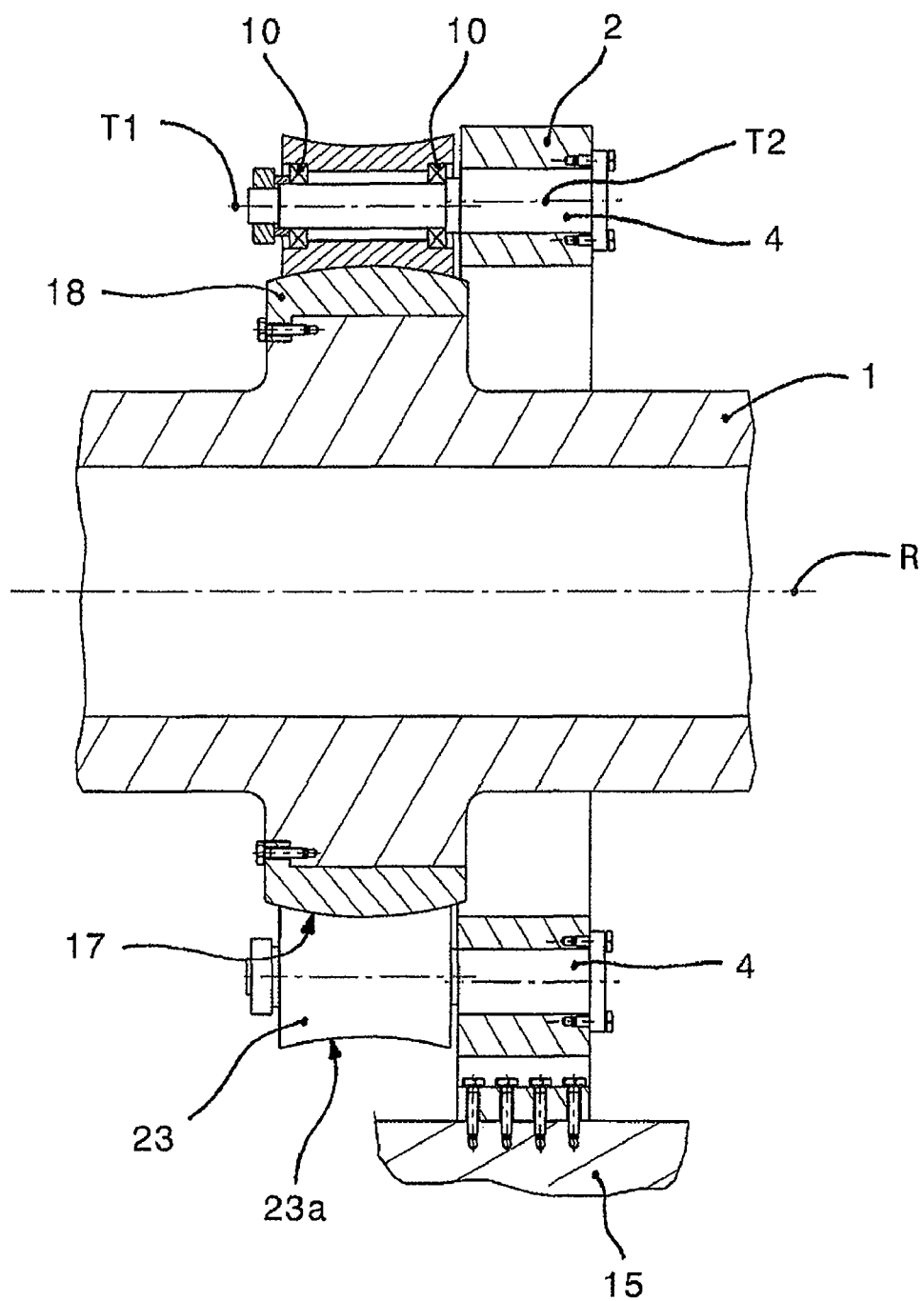
FIG. 2 is a cross-sectional view of a rotational bearing that is an alternative embodiment of the present invention rotationally supporting a second illustrative rotational body relative to a second illustrative support body.

FIG. 2 shows an example embodiment of a rotational bearing in which the carrier rollers 23 are mounted stationary on a frame 2.

The shaft 1 is formed such that it comprises a running surface 17 on its circumference. Carrier rollers 23 roll off on said running surface 17 and are rotatably mounted on sections of carrier trunnions 4. The carrier trunnions 4 are fixed in a stationary frame 2 which surrounds the shaft 1. The frame 2 is fixedly connected to a carrier structure 15.

The operating forces acting on the shaft 1 are transferred onto the frame 2 via the running surface 17, the carrier rollers 23 and the carrier trunnions 4. The carrier rollers 23 are mounted by roll bearings 10 on the carrier trunnions 4. As also in the example embodiment described on the basis of FIG. 1, the type of roll bearing determines whether—in addition to the radial forces—axial forces can also be transferred. In the case shown, a bearing is embodied with, for example, tapered roller bearings in an O arrangement, such that both axial and radial forces can be transferred from the shaft 1 onto the frame 2.

The running surface 17 has the shape of a spherical section, the centre-point of which is on the rotational axis R of the shaft 1. As in the example embodiment of FIG. 1, the profile of the shell surfaces 23a of the carrier rollers 23 preferably exhibits an arc which is approximately congruent to the shape of the running surface 17. The carrier rollers 23 are arranged in the frame 2 in such a way that the circular arc centre-points of the longitudinal profiles of their shell surfaces 23a, shaped in the contact zone by the operating load, coincide in a common point. This in turn enables an angled bearing between the shaft 1 and the frame 2, which prevents jamming in the bearing point due to the shaft 1 warping or due to a misalignment of the shaft 1 in the frame 2 caused by the load or assembly.

The running surface 17 is formed by a bearing ring 18 which is repeatedly radially divided and fixedly connected to the shaft 1. Dividing the bearing ring 18 is advantageous, in order to be able to assemble and disassemble the bearing point. As also in the example embodiment in accordance with FIG. 1, the carrier trunnions 4 preferably exhibit an eccentricity between the sections via which they are fixed in the frame 2 and the sections which serve to mount the carrier rollers 23. Here, too, this can equalize abrasion and production tolerances of the components.

In order to more easily assemble the bearing, the carrier rollers 23 can be formed such that they are axially divided at least once. See FIG. 4. If a shaft is provided with two of the bearing points described here, it is possible—as in the example in accordance with FIG. 1—to support a moment acting on the shaft and to equalize misalignments between the bearing points.

Figure 3:
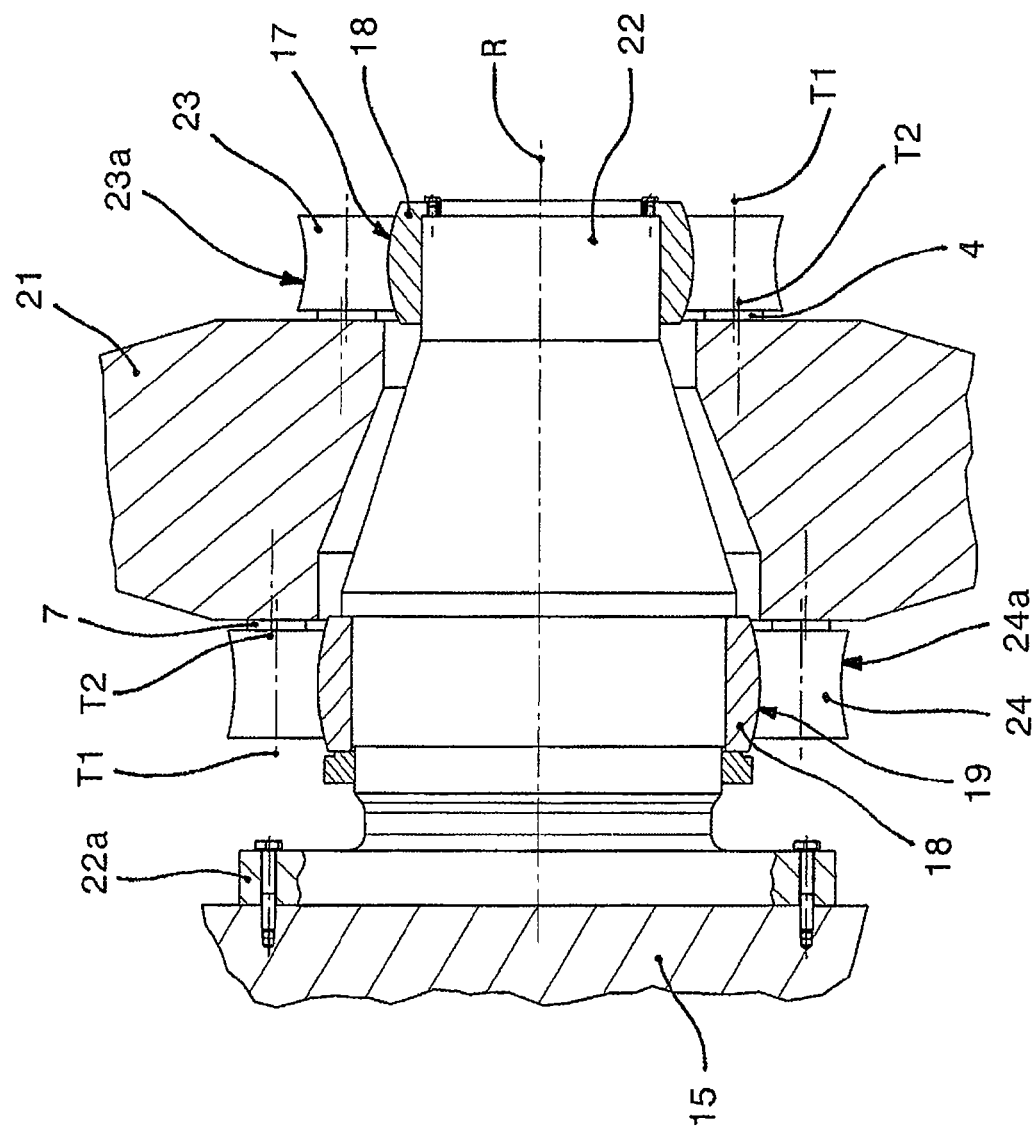
FIG. 3 is a cross-sectional view of a rotational bearing that is another alternative embodiment of the present invention rotationally supporting a third illustrative rotational body relative to a third illustrative support body.

FIG. 3 shows an example embodiment of a bearing of a component 21 revolving on a rotational axis R.

An axis trunnion 22 has a flange 22a via which it is immovably fastened to a carrier structure 15. In its longitudinal extension, it comprises two rotationally symmetrical running surfaces 17 and 19 on its circumference, these having the shape of spherical sections, the centre-points of which are on the rotational axis R of the axis trunnion 22. The embodiment of the carrier rollers 23, 24 and the running surfaces 17 and 19 corresponds to the principle described in FIG. 2, hence these are not discussed further here.

The carrier trunnions 4 and 7 of the carrier rollers 23 and 24 are arranged on the revolving component 21 in such a way that the circular arc centre-points of the longitudinal profiles of their shell surfaces 23a and 24a, shaped in the contact zone by the operating load, coincide in a common point for each of the two bearing points. The result of this is that the revolving component 21 can be mounted at an angle with respect to the axis trunnion 22 in the bearing points, such that the bearing points are prevented from jamming due to the revolving component 21 or the axis 22 deforming. The ability to set the angle of the bearing points can simultaneously equalize misalignments in the assembly.

As in the example embodiment in accordance with FIG. 1, the carrier rollers 23 and 24 are preferably mounted by roll bearings, wherein the type and arrangement of the bearings is preferably selected such that one of the bearing points transfers axial and radial forces and the other bearing point only transfers radial forces. The spatial distance of the bearing points enables moments acting on the revolving component 21 to be absorbed.

The running surfaces 17 and 19 are formed by bearing rings 18 which are repeatedly radially divided and fixedly connected to the axis trunnion 22. Dividing the bearing rings 18, 20 is necessary in order to be able to assembly and disassemble the bearing points.

As also in the example embodiments in accordance with FIG. 1 and FIG. 2, the carrier trunnions 4, 7 preferably exhibit an eccentricity between the sections via which they are fixed in the revolving component 21 and the sections which serve to mount the carrier rollers 23 and 24. Here, too, this can equalize abrasion and production tolerances of the components.

Figure 4:
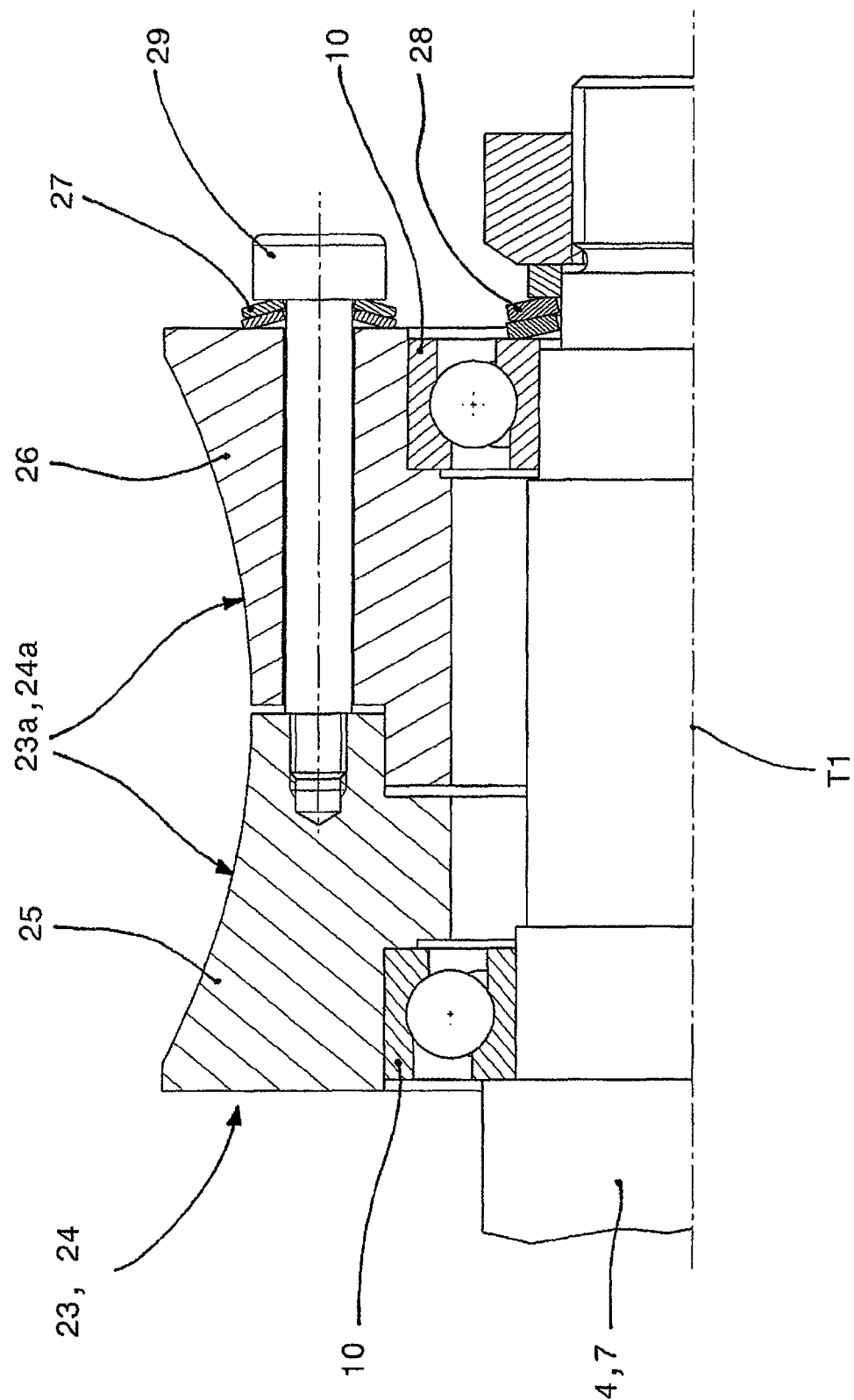
FIG. 4 is a cross-sectional view of an axially divided carrier roller.

FIG. 4 shows an axially divided carrier roller, wherein a carrier roller 23 or 24 in accordance with one of the example embodiments in accordance with FIGS. 2 and 3 is shown as an example. The carrier roller 23 or 24 is axially divided into two carrier roller segments 25 and 26 which together form the running surface 23a or 24a. In the running surface 23a or 24a, the separation between the segments 25 and 26 runs such that the running surface 23a or 24a formed jointly by the segments 25 and 26 is divided at the point which has the smallest distance from the rotational axis R of the rotational body.

The segments 25 and 26 are connected to each other in a non-positive and a positive lock. Shaft screws, arranged in uniform distribution about the rotational axis T1 of each carrier roller 23 or 24, serve as connecting elements 29. Each of the connecting elements 29 protrudes axially through the segment 26 and is fixedly connected—in the example embodiment, screwed—to the segment 25. The connecting elements 29 extend in the segment 26 over the length of their smooth segment area in each case, such that they each form a linear guiding element which axially and linearly guides the segment 25 on the segment 26. Another axial, linear guide is created by the stepped separation surface comprising axially extending guiding surfaces between the segment 25 and the segment 26.

The connecting elements 29 press the segments 25 and 26 axially against each other via spring elements 27—in the example embodiment, disc springs—such that as a result, a non-positive lock is achieved. In principle, it would also be possible to omit the spring elements 27. The effect of self-adjusting readjustment by axially dividing the carrier rollers 23 and 24 can also be achieved solely by the axial elasticity of the connecting elements 29 or other suitable connecting elements.

The bearings 10 of the carrier rollers 23 and 24 are elastically tensed on the respective carrier trunnion 4 or 7 in the axis direction by means of other spring elements 28 which in the example embodiment are also formed as disc springs. In the event of axial movements, the bearings 10 can thus give elastically between the segments 25 and 26.

Figure 5:
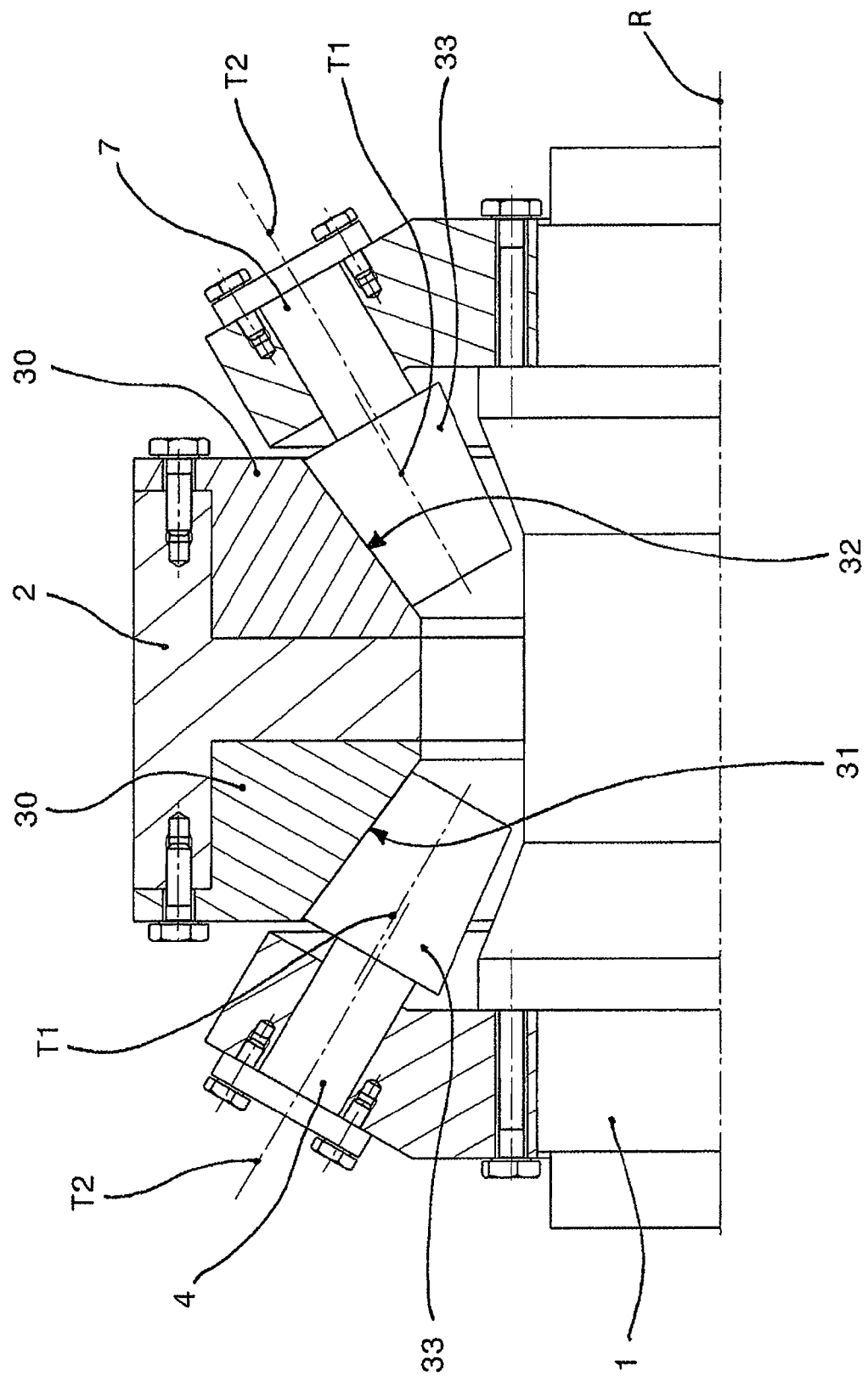
FIG. 5 is a cross-sectional view of a rotational bearing that is an alternative embodiment of the present invention rotationally supporting a fourth illustrative rotational body relative to a fourth illustrative support body.

FIG. 5 shows another example of a rotational bearing in accordance with the invention, being a tapered roller bearing comprising two sets of carrier rollers 33, of which a first set rolls off on a running surface 31 and a second set rolls off on a running surface 32. The carrier rollers 33 are formed as tapered rollers and are each rotatably mounted on carrier roller rotational axes T1, preferably as explained on the basis of the other example embodiments. The carrier roller rotational axes T1 are formed by a carrier trunnion 4 or 7 for each carrier roller 33, corresponding to the carrier trunnions of the other example embodiments. The carrier roller rotational axes T1 point obliquely with respect to each other at a first angle, and each points obliquely with respect to the rotational axis R at a second angle. The second angle is preferably the same for both rotational axes T1. The carrier trunnions 4 and 7 are each mounted, such that they can be rotationally adjusted about an adjustment axis T2 and fixed in any adjustment position, in flanges which project radially from the rotational body 1. The carrier roller rotational axes T1 and the adjustment axes T2 run eccentrically parallel to each other for each carrier trunnion 4 and 7. The running surfaces 31 and 32 are each formed by a bearing body 30 fastened to the frame 2. The running surfaces 31 and 32 are level tapered inner surfaces.

Rotational bearings formed as tapered roller bearings, comprising at least two tapered roller bearings having at least two running surfaces which are pitched towards each other, as for example shown on the basis of the example embodiment of FIG. 5, can advantageously be built very short in the axial direction. Furthermore, they allow the tension to be very easily adjusted, by mounting the tapered rollers—for example, the tapered rollers 33 of the example embodiment—such that they can be linearly adjusted along their respective carrier roller rotational axis T1. If a clearance arises due to abrasion, tapered rollers 33 mounted in this way merely have to be pushed along their rotational axes T1 further into their running surface—for example, the running surface 31 and/or 32. This can indeed be done individually for each tapered roller 33. Linear adjustment is an alternative to eccentric adjustment. It is also possible, as appropriate, to provide both ways of adjusting, to supplement each other. However, an adjusting mechanism which affords the option of detaching the carrier rollers—for example, the tapered rollers 33—from the assigned running surface—for example, 31 or 32—is preferred, since this facilitate exchanging the carrier roller in question. For easily adjusting the tension, however, the ability to shift linearly also has its advantages.

The invention claimed is:
1. A rotational bearing configured to support a first body for rotation relative to a second body about a rotational axis, one of the first or second bodies being a rotational body and the other being a support body, said rotational bearing comprising:
 five or more carrier rollers, each carrier roller individually mounted to the first body for rotation about a respective carrier roller rotational axis extending therefrom, and each carrier roller being in rolling contact with the second body, wherein the carrier roller axes are adjustable and fixable axes relative to the first body, and wherein each of the carrier rollers can be optionally and individually removed from the first body and the remaining carrier rollers support the rotational body in any radial direction with respect to the rotational axis and rotationally mount the rotational body centered between the remaining carrier rollers.

2. The rotational bearing according to claim 1, wherein one or more of the carrier rollers are axially divided at least once into carrier roller segments.

3. The rotational bearing according to claim 2, wherein the carrier roller segments of a respective carrier roller are connected to each other in a non-positive lock and a positive lock, such that they can be moved axially relative to each other.

4. The rotational bearing according to claim 1, wherein the first body is the support body and the second body is the rotational body.

5. The rotational bearing according to claim 1, wherein the carrier rollers are rotationally mounted by carrier trunnions projecting from the first body.

6. The rotational bearing according to claim 5, wherein at least one of the carrier rollers is mounted on its carrier trunnion and secured against shifting axially.

7. A system for generating energy which comprises a rotor driven by external energy, the rotor supported by at least one rotational bearing according to claim 1.

8. A wind power plant which comprises a rotor driven by external energy, the rotor supported by at least one rotational bearing according to claim 1.

9. The wind power plant according to claim 8, wherein the rotor is a wind turbine.

10. A rotational bearing configured to support a first body for rotation relative to a second body about a rotational axis, one of the first or second bodies being a rotational body and the other being a support body, said rotational bearing comprising:

a plurality of carrier rollers, each carrier roller individually mounted to the first body for rotation about a respective carrier roller rotational axis extending therefrom, and each carrier roller being in rolling contact with the second body, wherein each of the carrier rollers can be optionally and individually removed from the first body and the remaining carrier rollers support the rotational body in any radial direction with respect to the rotational axis and rotationally mount the rotational body centered between the remaining carrier rollers, and wherein the first body is the rotational body and the second body is the support body.

11. A rotational bearing configured to support a first body for rotation relative to a second body about a rotational axis, one of the first or second bodies being a rotational body and the other being a support body, said rotational bearing comprising:

a plurality of carrier rollers, each carrier roller individually mounted to the first body for rotation about a respective carrier roller rotational axis extending therefrom, and each carrier roller being in rolling contact with the second body, wherein each of the carrier rollers can be optionally and individually removed from the first body and the remaining carrier rollers support the rotational body in any radial direction with respect to the rotational axis and rotationally mount the rotational body centered between the remaining carrier rollers, and wherein the rotational bearing defines a tapered roller bearing.

12. The rotational bearing according to claim 11, wherein one or more of the carrier rollers are mounted such that they can be axially adjusted along the respective carrier roller rotational axis and fixed in the adjustment position.

13. The rotational bearing according to claim 11, wherein the carrier rollers are in rolling contact with opposed running surfaces which extend obliquely with respect to the rotational axis.

14. A rotational bearing configured to support a first body for rotation relative to a second body about a rotational axis, one of the first or second bodies being a rotational body and the other being a support body, said rotational bearing comprising:

a plurality of carrier rollers, each carrier roller individually mounted to the first body for rotation about a respective carrier roller rotational axis extending therefrom, and each carrier roller being in rolling contact with the second body, wherein each of the carrier rollers can be optionally and individually removed from the first body and the remaining carrier rollers support the rotational body in any radial direction with respect to the rotational axis and rotationally mount the rotational body centered between the remaining carrier rollers, and wherein the carrier roller carrier axes can be adjusted relative to the first body parallel to the rotational axis, and can be fixed in different adjustment positions, in order to be able to adjust a radial distance between the carrier axes and the rotational axis.

15. The rotational bearing according to claim 14, wherein the carrier rollers are rotationally mounted by eccentric carrier trunnions projecting from the first body and each carrier trunnion has a trunnion axis spaced parallel from the respective carrier roller axis such that each carrier trunnion can rotate about its trunnion axis to adjust the distance of the respective carrier axis relative to the rotational axis.

16. A rotational bearing configured to support a first body for rotation relative to a second body about a rotational axis, one of the first or second bodies being a rotational body and the other being a support body, said rotational bearing comprising:

a plurality of carrier rollers, each carrier roller individually mounted to the first body for rotation about a respective carrier roller rotational axis extending therefrom, and each carrier roller being in rolling contact with the second body, wherein each of the carrier rollers can be optionally and individually removed from the first body and the remaining carrier rollers support the rotational body in any radial direction with respect to the rotational axis and rotationally mount the rotational body centered between the remaining carrier rollers, and wherein the carrier rollers are in rolling contact with a running surface extending along the second body about the rotational axis.

17. The rotational bearing according claim 16, wherein the running surface is defined by either a shell outer surface surrounded by the carrier rollers or a shell inner surface surrounding the carrier rollers.

18. The rotational bearing according to claim 16, wherein at least a portion of the running surface is defined by a bearing body connected to the second body.

19. The rotational bearing according to claim 18, wherein the bearing body is removably connected to the second body.

20. The rotational bearing according to claim 18, wherein the bearing body is radially divided into at least two bearing body sectors which each form a part of the running surface, each bearing body sector extending in the circumferential direction about the rotational axis over an arc of 180° or less.

21. The rotational bearing according to claim 18, wherein the bearing body is axially divided into at least two bearing body axial segments, said bearing body axial segments being rotationally securable relative to one another.

22. The rotational bearing according to claim 21, wherein the bearing body axial segments abut each other in a radial plane extending through a point in which the running surface exhibits a largest or a smallest radial distance from the rotational axis.

23. The rotational bearing according to claim 18, wherein the bearing body is an annular body.

24. The rotational bearing according to claim 16, wherein the running surface is convex with respect to the rotational axis.

25. The rotational bearing according to claim 24, wherein the running surface is curved in the axial direction away from the rotational axis.

26. The rotational bearing according to claim 16, wherein the running surface is concave with respect to the rotational axis.

27. The rotational bearing according to claim 26, wherein the running surface is curved in the axial direction toward the rotational axis.

28. The rotational bearing according to claim 16, wherein the running surface is an annular section of a spherical surface or strip of a toroidal surface which is concentric with respect to the rotational axis.

29. The rotational bearing according to claim 16, wherein the carrier rollers having rolling surfaces that are shaped to conform to the shape of the running surface.

30. The rotational bearing according to claim 29, wherein either the running surface forms an annular section of a spherical surface or strip of a toroidal surface which is concentric with respect to the rotational axis, or the rolling surfaces of the carrier rollers each form a circular arc in the axial direction.

* * * * *